United States Patent
Lindblad et al.

(10) Patent No.: US 6,334,643 B1
(45) Date of Patent: Jan. 1, 2002

(54) VEHICLE SEAT

(75) Inventors: Karl-Gunnar Lindblad, Vårgårda; Anders Svantesson, Tollered, both of (SE)

(73) Assignee: Autoliv Development AB, Vårgårda (SE)

(*) Notice: Subject to any disclaimer, the term of this patent is extended or adjusted under 35 U.S.C. 154(b) by 0 days.

(21) Appl. No.: 09/674,995

(22) PCT Filed: May 1, 2000

(86) PCT No.: PCT/SE00/00392

§ 371 Date: Jan. 30, 2001

§ 102(e) Date: Jan. 30, 2001

(87) PCT Pub. No.: WO00/53451

PCT Pub. Date: Sep. 14, 2000

(30) Foreign Application Priority Data

Mar. 10, 1999 (GB) .............................................. 9905519

(51) Int. Cl.⁷ ................................................ B60N 2/02
(52) U.S. Cl. ................ 296/65.09; 296/68.1; 297/216.1; 297/216.16; 297/216.19
(58) Field of Search .............................. 296/68.1, 65.09; 297/216.1, 216.14, 216.16, 216.19

(56) References Cited

U.S. PATENT DOCUMENTS

| | | | | |
|---|---|---|---|---|
| 2,735,476 A | * | 2/1956 | Fieber | 297/216.19 |
| 2,823,730 A | * | 2/1958 | Lawrence | 296/68.1 |
| 4,008,917 A | * | 2/1977 | Sigwarth et al. | 296/68.1 |
| 4,154,472 A | * | 5/1979 | Bryll | 296/68.1 |
| 4,634,169 A | * | 1/1987 | Hasstedt | 296/68.1 |
| 4,840,427 A | * | 6/1989 | Hong | 296/65.09 |
| 4,993,776 A | * | 2/1991 | Acuto et al. | 297/216.1 |
| 5,022,707 A | * | 6/1991 | Beauvais et al. | 297/219.19 |
| 5,152,578 A | * | 10/1992 | Kiguchi | 297/216.16 |
| 5,290,089 A | | 3/1994 | Oleszko et al. | |
| 5,636,424 A | | 6/1997 | Singer et al. | |
| 5,647,628 A | | 7/1997 | Pires et al. | |
| 5,722,722 A | | 3/1998 | Massara | |
| 5,967,604 A | * | 10/1999 | Yoshida et al. | 297/216.1 |
| 6,048,034 A | * | 4/2000 | Aumont et al. | 297/216.1 |
| 6,076,887 A | * | 6/2000 | Andersson | 297/216.1 |
| 6,142,564 A | * | 11/2000 | Pajela et al. | 297/216.19 |

FOREIGN PATENT DOCUMENTS

| | | | | |
|---|---|---|---|---|
| DE | 001906813 | * | 10/1978 | 297/216.19 |
| DE | 003237167 | * | 4/1984 | 297/216.16 |
| GB | 001199577 | * | 7/1970 | 296/68.1 |
| GB | 1 228 657 | | 4/1971 | |
| GB | 1 286 439 | | 8/1972 | |
| GB | 2 330 068 | | 4/1999 | |
| IT | 000540464 | * | 2/1957 | 297/216.19 |
| NL | 079003166 | * | 10/1980 | 297/216.14 |
| WO | WO 96/16834 | | 6/1996 | |

* cited by examiner

*Primary Examiner*—Joseph D. Pape
*Assistant Examiner*—Kiran B. Patel
(74) *Attorney, Agent, or Firm*—Venable; Robert Kinberg

(57) ABSTRACT

A vehicle seat includes a support structure located beneath the seat and a squab located above the support structure. A back-seat extends substantially upwardly from the rear part of the squab. A mechanism pivotally connects the rear part of the squab to the support structure to permit the rearward tilting of the back-rest while tilting upwards the squab. A kinetic energy absorbing mechanism absorbs energy when the seat executes a tilting movement. The energy absorbing mechanism is located beneath the squab and is connected to a pivotal linkage between the support structure and a forward part of the squab of the seat.

9 Claims, 4 Drawing Sheets

VEHICLE SEAT

BACKGROUND OF THE INVENTION

THE PRESENT INVENTION relates to a vehicle seat, and more particularly relates to a vehicle seat intended for use in a motor vehicle, such as a motor car.

It has been proposed previously to provide a vehicle seat which, in the event of a rear impact, moves towards the rear of the vehicle, preferably with a pivoting or tilting action.

GB-A-1,228,657 discloses a seat of this type in which the main body of the seat is pivotally connected to the floor of tile vehicle, and the front part of the seat is connected to the floor of the vehicle by a device arranged to absorb kinetic energy. The arrangement is such that, in the event of a rear impact, the seat pivots in a rearward direction about the pivotal connection between the seat and the floor of the vehicle, whilst the device that absorbs kinetic energy becomes extended.

It is believed that the risk of a passenger being injured in an accident involving a rear impact may be reduced if a seat of this general type is utilised, and the present invention seeks to provide an improved vehicle scat.

The device shown in GB-A-1,228,657 that absorbs kinetic energy extends from the front past of the seat towards the floor of die vehicle just in front of the seat, and consequently may well obstruct the legs of a person sitting in the seat. Additionally, tie illustrated device has to have a substantial length in order to permit a desired degree of tilting.

BRIEF SUMMARY OF THE INVENTION

According to this invention there is provided a vehicle seat, the seat comprising a support structure located beneath the seat, and a squab located above the support structure, the seat further including a back-rest extending substantially upwardly from the rear part of the squab of the seat, there being means pivotally connecting the rear part of the squab of the seat to the support structure, to permit the rearward tilting of the back-rest of the seat with a simultaneous upward tilting of the squab of the seat, there being a kinetic energy absorbing means adapted to absorb kinetic energy when the seat executes tie tilting movement; the kinetic energy absorbing means being located beneath the squab of the seat and having one end thereof connected to one element of a pivotal linkage, tile pivotal linkage extending between the support structure and a forward part of the squab of the scat.

Preferably the support structure comprises a carriage slidably mounted along rails proved on the floor of the vehicles Conveniently the pivotal linkage comprises two elements, one element being pivotally connected to the support structure, and also pivotally connected to the other element, the other element being pivotally connected to the squab of the seat.

Advantageously the said one element defines three pivot points which are located at the corners of the triangle, one pivot point being connected to the support structure, a further pivot point being connected to the other pivot element, and the third pivot point being connected to the kinetic energy absorbing means.

Preferably the kinetic energy absorbing means had one end thereof connected to the support structure.

In one embodiment the kinetic energy absorbing means comprises a piston and cylinder device.

Alternatively the kinetic energy absorbing means comprises a metallic plate of arcuate form.

Conveniently the metallic plate of arcuate form is provided with a notch or recess formed in the inner edge of the arc to provide a region of mechanical weakness.

In a preferred embodiment the point of pivotal connection between the support structure and the rear of the squab of the seat, and the point of pivotal connection of the linkage and the front part of the squab of the seat are adjustably positionable relative to the squab of the seat to permit an adjustment of the position or orientation of the squab of the seat.

BRIEF DESCRIPTION OF THE DRAWINGS

In order that the invention may be more readily understood, and so that further features thereof may be appreciated, the invention will now be described, by way of example, with reference to the accompanying drawings in FIG. 1 is a side view of a seat in accordance with the invention, illustrating the occupant of the seat, tile seat being shown in an initial position.

DETAILED DESCRIPTION OF THE INVENTION

Figure 1:
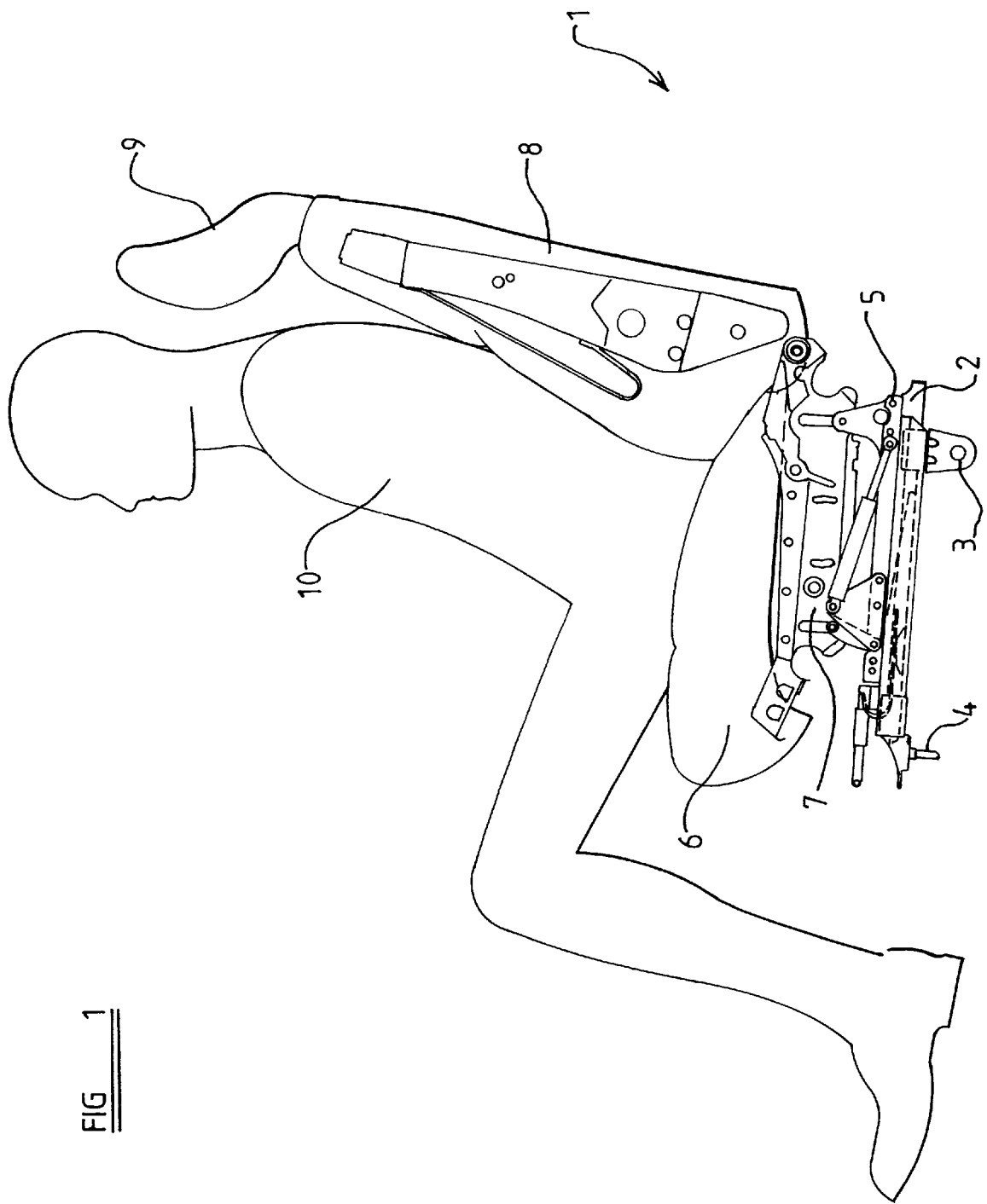

Referring initially to FIG. 1 of the accompanying drawings, a vehicle seat 1 is provided which is mounted on a rail 2, the rail 2 having lugs 3,4 by means of which the rail may be mounted to the floor of the motor vehicle. A carriage 5 is provided which is mounted on the rail 2 so as to be slidable along the rail 2. The carriage 5 acts as a support structure for the seat 1.

The seat 1 has a squab 6 which incorporates a sub-frame 7 which is supported by the carriage 5, as will be described in greater detail below. The seat 1 also has a back 8 having a head-rest 9. The back extends upwardly from a rear part of the squab 6. The seat is shown, in FIG. 1, with an occupant 10.

Figure 2:
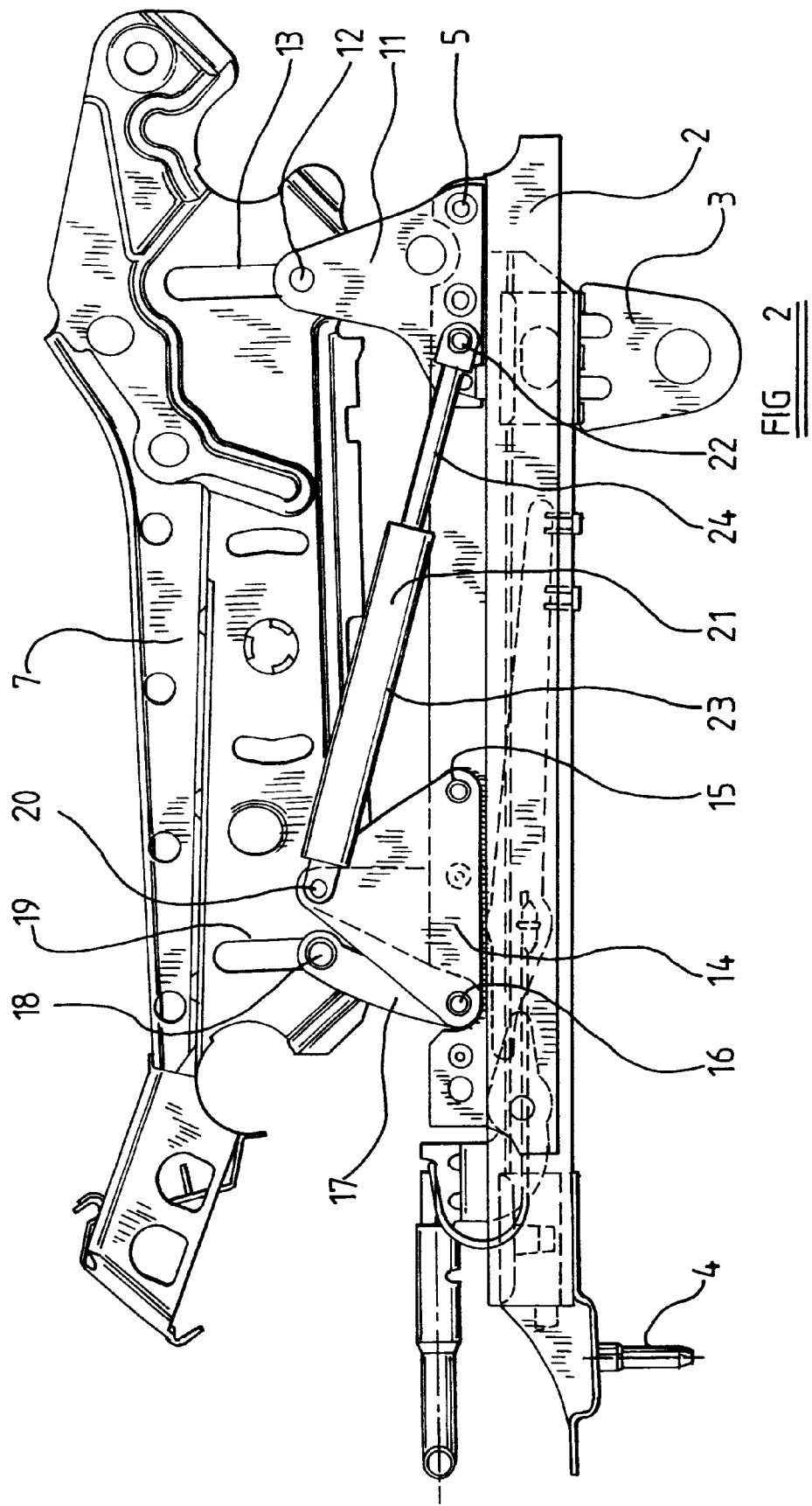
FIG. 2 is all enlarged view of part of the seat of FIG. 1 in a first position.

Referring now to FIG. 2, it can be seen that the carriage 5 is provided, at its rearward end, with all upstanding lug 11 which is of generally triangular form. The upper part of the lug carries a pivot pin 12, which pivotally engages the sub-frame 7. In the illustrated embodiment the pivot pin 12 is accommodated within a vertical oval-shaped elongate slot or aperture 13 formed in the sub-frame 7, and a mechanism (not shown) is provided to selectively adjust tie position of the pivot pin 12 within the slot 13, thus raising and lowering the rear part of the sub-frame 7 relative to the carriage 5, and thus adjusting the position of the squab 6 of the seat.

Towards the front of the carriage 5, a triangular connecting plate 14 is provided. The lower right-hand corner of the connecting plate 14 is pivotally connected by means of a pivot 15 to tie carriage 5. The left-hand lower corner of the plate 14 is connected by a pivot 16 to one end of an elongate lever arm 17, the other end of the lever arm 17 having a pivot pin 18 which is pivotally connected to the sub-frame 7. The pivot pin 18 is accommodated within a vertical elongate slot or aperture 19 which is formed within the sub-frame 7. A mechanism (not shown) is provided for selectively adjusting the position pin 18 within the elongate aperture 19, thus enabling the front part of the sub-frame 7 to be raised or lowered, adjusting the position of the squab 6 of the seat.

The upper-most corner of the triangular connecting plate 14 is pivotally connected by means of a pivot 20 to a generally elongate kinetic energy absorbing arrangement 21, the other end of which is connected, by means of a pivot pin 22, to the carriage 5 at a position adjacent the upstanding triangular lug 11. The triangular connecting plate thus has three pivot axes which are located at the corners of a notional triangle.

In this embodiment the invention, the kinetic energy absorbing means comprises a cylinder 23 accommodating a piston, the piston having a piston shaft 24. The cylinder may contain a viscous fluid, and the piston may be provided with a aperture therethrough. However, as will become clear, many different types of kinetic energy absorbing device may be used.

It is to be appreciated that in the event of a rear impact to a motor vehicle in which the described seat is mounted, the floor pan of the vehicle will move forwardly, thus moving the rail 2 and the carriage 5 forwardly. Consequently the sub-frame 7 and the squab 6 of the seat will begin to move forwardly, tending to provide a forward acceleration to the occupant 10 of the sear. The torso of the occupant of the seat will have substantial inertia, and consequently the torso of the occupant of the seat will effectively impart a substantial relative rear-ward force to the back of the seat. In the described embodiment this will tend to cause the seat to pivot about the pivot axis defined by the pivot pin 12 carried on the lug 5, with the front part of the frame moving upwardly. Consequently the seat will tend to pivot towards the position shown in FIG. 3.

It can be seen that as the seat pivots, the lever arm 17 is drawn upwardly with the sub-frame 7, thus tending to rotate the triangular plate 14 about the pivot axis 15. This moves the pivot axis 20 of the triangular plate 14 generally towards the pivot axis 22 to which the kinetic energy absorber 21 is connected, thus compressing the kinetic energy absorber 21 so that the kinetic energy absorber 21 absorbs kinetic energy.

It is to be noted that the combination of the lever arm 17 and the triangular plate 14 acts as a gearing arrangement in that the movement of the pivot pin 18 caused by the upward movement of the sub-frame 7 is much greater than the consequent movement of the pivot pin 20 on the triangular plate 14. The gearing arrangement thus provides a mechanical advantages. It is, of course, the movement of the pivot pin 20 on the triangular plate 14 that is actually resisted by the kinetic energy absorber. Thus the gearing arrangement constituted by the combination of the lever arm 17, and the pivotally mounted plate 14 enables the use of a relatively small kinetic energy absorber.

It is to be noted that in the described embodiment, the kinetic energy absorber 21 is mounted beneath the squab of the seat and thus does not obstruct the occupant of the seat any way. The kinetic energy absorber does have a certain length, and is conveniently mounted to be substantially horizontal beneath the squab of the seat.

Figure 3:
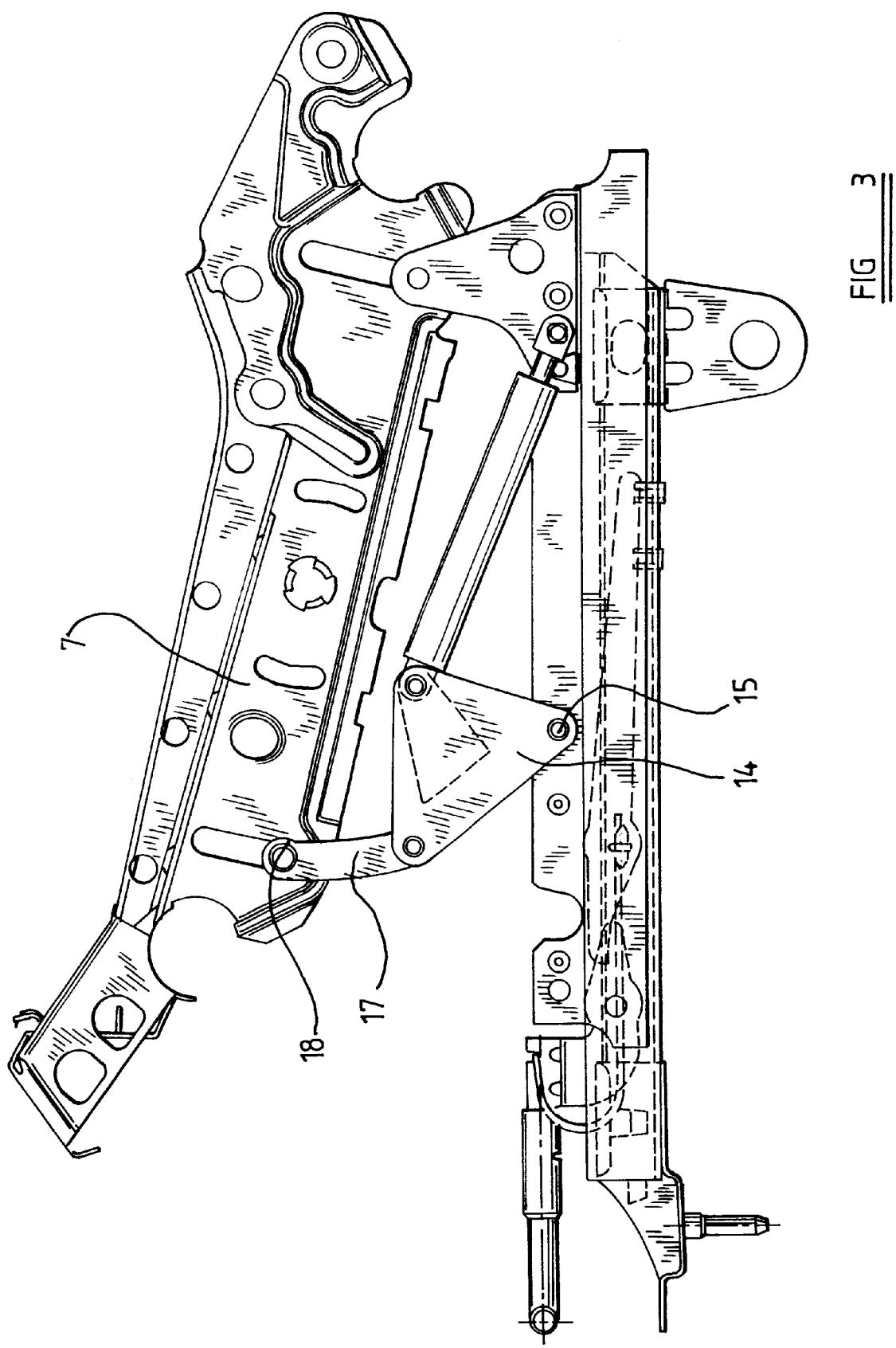
FIG. 3 is a view corresponding to FIG. 2 illustrating the seat after a rear impact has occurred.
Figure 4:
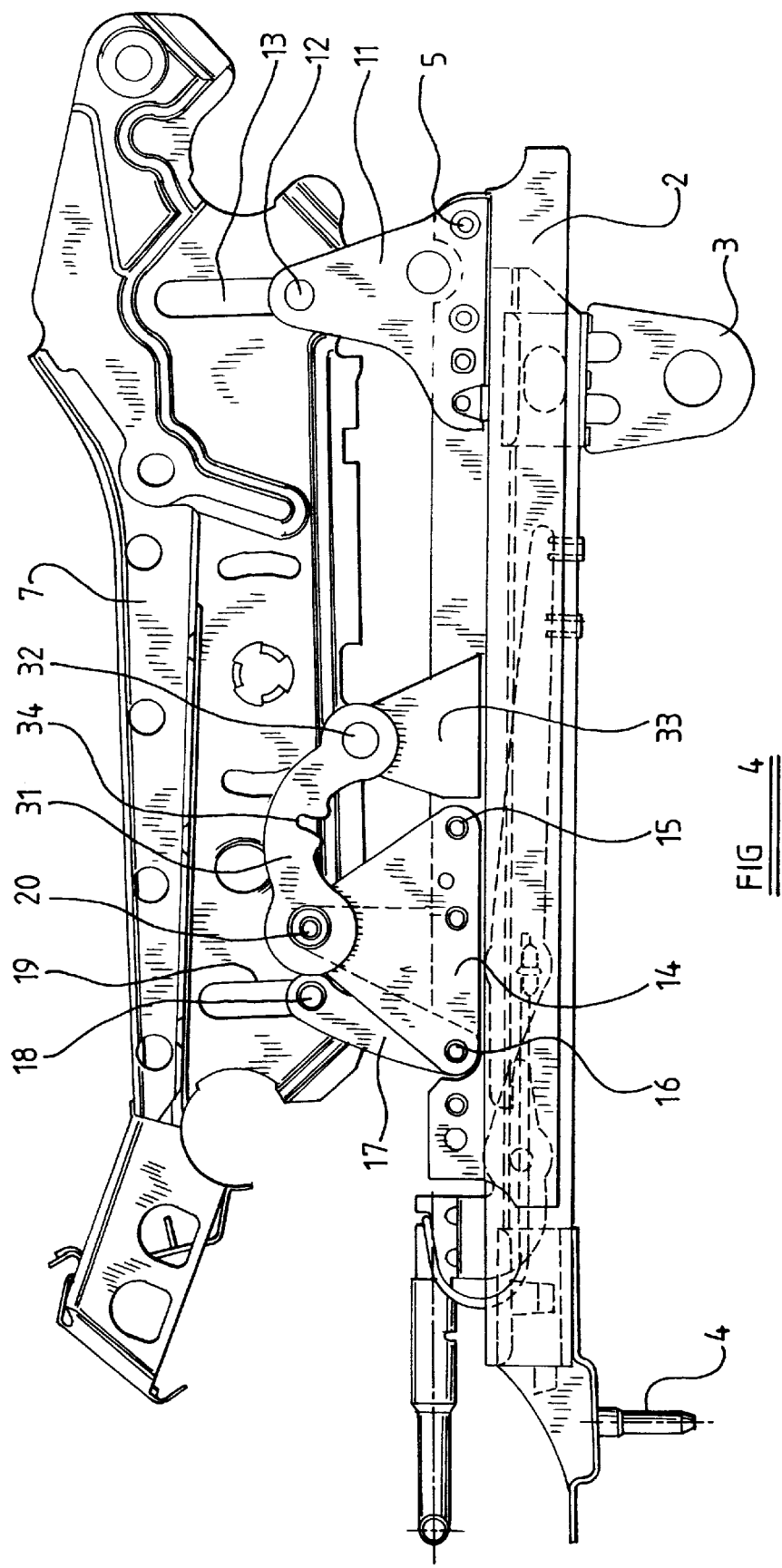
FIG. 4 is a view, corresponding to FIG. 2, illustrating an alternative embodiment of the invention.

Whilst one embodiment has been described with reference to FIGS. 1 to 3, in an alternative embodiment of the invention, as shown in FIG. 4, a different form of kinetic energy absorber is utilised.

In the embodiment of FIG. 4; the various components of the seat 1, rail 2, carriage 3 and sub-frame 7 that are the same as in the embodiment described with reference to FIGS. 1 to 3, are identified with the same reference numerals, and will not be re-described.

In the embodiment of FIG. 4, the kinetic energy absorber comprises a metal plate 31 of elongate arcuate form, having one end pivotally connected by the pivot 20 to one corner of the triangular plate 14, and having the other end pivotally connected by means of a pivot 32 to a triangular mounting lug 33 that is securely connected to the carriage 5.

The arcuate element 31 is provided, substantially at its mid point, with a substantially "V"-shaped notch, recess or cut-out 34 on the inner edge of the arc. This provides an area of relative mechanical weakness, The components will occupy their illustrated position when the seat is in its ordinary state. In the event that a rear impact should arise, there will be a tendency, in the manner described above, for the sub-frame 7 to pivot about the axis defined by the pivot pin 12, with the front part of the sub-frame 7 rising. This again will cause the gearing arrangement constituted by the lever arm 17 and the triangular plate 14 to pivot about their pivotal connections towards the condition shown in FIG. 3. As the gearing arrangement constituted by the triangular plate 14 and the lever arm 17 pivot, so the arcuate member 31 will be deformed, with the ends of the arcuate member 31 being driven towards each other. The main deformation will occur in the region adjacent the "V"-shaped cut-out 34.

It is to be observed that in this embodiment, the kinetic energy absorbing element is again located beneath the sub-frame 7 of the squab of the seat, and again a gearing or mechanical advantage is provided, by the triangular plate 14 and the lever arm 17, to enable a relatively small kinetic energy absorbing element to be utilised.

What is claimed is:

1. A vehicle seat, comprising:
   a support structure;
   a squab above the support structure with a rear part and a forward part;
   a back-rest extending substantially upwardly from the rear part of the squab;
   means for pivotally connecting the rear part of the squab to the support structure, wherein the means for pivotally connecting permits rearward tilting of the back-rest of the seat with a simultaneous upward tilting of the squab of the seat;
   means for absorbing kinetic energy to absorb kinetic energy located beneath the squab of the seat and having at least two ends; and
   a pivotal linkage connected to one end of the means for absorbing kinetic energy extending between the support structure and the forward part of the squab of the seat.

2. A seat according to claim 1, wherein the support structure comprises a carriage slidably mounted along rails provided on the floor of the vehicle.

3. A seat according to claim 1, wherein the pivotal linkage comprises a first element and a second element, the first element being pivotally connected to the support structure and pivotally connected to the second element, the second element being pivotally connected to the squab of the seat.

4. A seat according to claim 3, wherein said first element defines three pivot points which are located at corners of a triangle, a first pivot point being connected to the support structure, a second pivot point being connected to the second pivot element, and a third pivot point being connected to the kinetic energy absorbing means.

5. A seat according to claim 1, wherein the kinetic energy absorbing means has one end thereof connected to the support structure.

6. A seat according to claim 1, wherein the kinetic energy absorbing means comprises a piston and cylinder device.

7. A seat according to any one of claim 1, wherein the kinetic energy absorbing means comprises a metallic plate of arcuate form.

8. A seat according to claim 7, wherein the metallic plate of arcuate form with an arc having an inner edge, wherein said plate is provided with at least one of a notch and recess formed in the inner edge of the arc to provide a region of mechanical weakness.

9. A seat according claim 1, wherein the pivotal connection between the support structure and the rear of the squab of the seat, and the point of pivotal connection of the linkage and the front part of the squab of the seat are adjustably positionable relative to the squab of the seat to permit an adjustment of the position of the squab of the seat.

* * * * *

UNITED STATES PATENT AND TRADEMARK OFFICE
CERTIFICATE OF CORRECTION

PATENT NO. : 6,334,643 B1
DATED : January 1, 2002
INVENTOR(S) : Karl-Gunnar Lindblad and Anders Svantesson It is certified that error appears in the above-identified patent and that said Letters Patent is hereby corrected as shown below:

<u>Title page,</u>
Change item [22] to read as follows:

-- [22] PCT Filed:     March 1, 2000 --

Signed and Sealed this

Thirtieth Day of July, 2002

Attest:

JAMES E. ROGAN
Attesting Officer          Director of the United States Patent and Trademark Office